June 2, 1970  G. F. MACHLUP ET AL  3,515,239
STETHOSCOPE HEAD CONSTRUCTION
Filed July 16, 1968
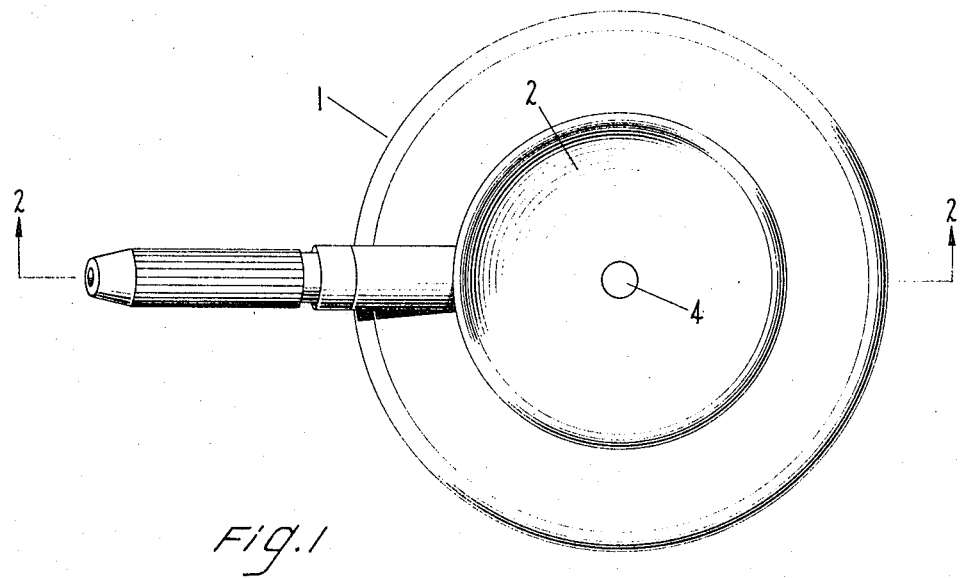
Fig. 1
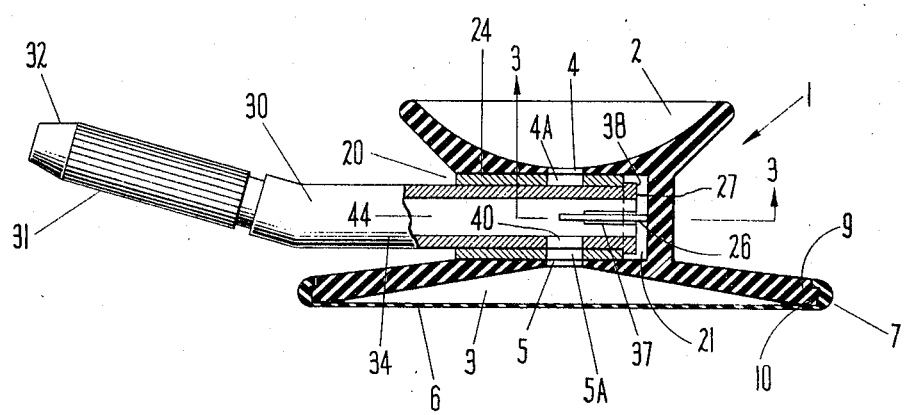
Fig. 2
Fig. 3
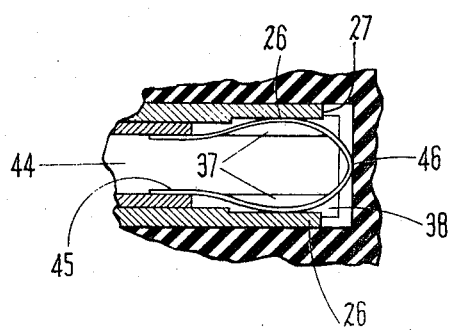
INVENTORS
Gustav F. Machlup
BY David Littmann
Wolf, Greenfield & Sacks 
United States Patent Office 3,515,239
Patented June 2, 1970

3,515,239
STETHOSCOPE HEAD CONSTRUCTION
Gustav F. Machlup and David Littmann, Belmont, Mass., assignors to Minnesota Mining and Manufacturing Company, Maplewood, Minn., a corporation of Delaware
Filed July 16, 1968, Ser. No. 745,170
Int. Cl. A61b 7/02
U.S. Cl. 181—24       6 Claims

ABSTRACT OF THE DISCLOSURE

An inexpensive, multi-sound chamber, stethoscope chestpiece formed of a body of plastic having a metal bushing in a cavity with a metal stem rotatably secured within the bushing. The bushing is provided with slots adapted to receive a spring engaged by the stem for selective, rotational positioning of a hole in the stem with respect to the sound chambers of the chestpiece. A diaphragm is secured to one sound chamber of the chestpiece body by a snap-on rim that engages an offset shoulder about the periphery of the sound chamber.

BACKGROUND OF THE INVENTION

Most commercially available stethoscopes are made with metal chestpieces. Although metal is generally more expensive to form and shape in the complex configuration of the chestpiece than is plastic, metal has been conventionally used because it has been deemed acoustically necessary. For example, it has been generally assumed that a multi-sound chamber chestpiece having a rotatable stem adapted to selectively connect the binaurals of a stethoscope acoustically to one or the other of the sound chambers would result in a construction that would ultimately wear and become unacceptable over a relatively short period of time. The constant rotation of the stem relative to the chestpiece body would cause a loosening of the stem in the chestpiece body with a resulting acoustical loss through this loose interengagement. As a result, it has been substantially impossible to drastically reduce the cost of a stethoscope chestpiece. This is unfortunate because there are many applications where it is desirable to have chestpieces that are so inexpensive that they can be thrown away after a limited number of uses. For example, there is a real need to provide stethoscope chestpieces which can be provided for use in examining patients with contagious diseases in which it is desirous not to use the stethoscope after examining the patient. There are other applications where remarkably inexpensive chestpieces might have substantial value including, for example, stethoscopes in underdeveloped countries where today even a moderately priced stethoscope is often beyond the reach of many who might otherwise have need or use for them.

SUMMARY OF THE INVENTION

It is therefore an object of the present invention to provide an improved stethoscope chestpiece which is primarily made of plastic but which nonetheless is capable of functioning equally as well as a conventional stainless steel or aluminum chestpiece. A further object of the present invention is to provide a stethoscope chestpiece made primarily of plastic which may be made for a manufacturing cost in the order of twenty cents to twenty-five cents per unit, as compared with the manufacturing cost in the order of $1.50 to $2.00 for metal stethoscope chestpieces.

A further object of the present invention is to provide a stethoscope chestpiece made primarily of plastic which is capable of being used over a prolonged period of time without losing its acoustical efficiency. A further object of the present invention is to provide an improved stethoscope chestpiece having a plurality of diaphragms that are commonly connected to a rotatable stem for selective connection to a binaural in which the stethoscope body is made primarily of plastic and which functions with efficiency equal to the efficiency of a metal chestpiece.

A further object of the present invention is to provide a stethoscope chestpiece made primarily of plastic which is capable of easy and relatively inexpensive manufacturing procedures, and in which many of the manufacturing procedures conventionally associated with the manufacture of metal chestpieces are totally eliminated or modified. A further object of the present invention is to provide an improved stethoscope chestpiece which is easy to assemble, disassemble and repair.

In the present invention there is provided an improved stethoscope chestpiece made primarily of plastic and preferably having a plurality of opposed diaphragms interconnected through a rotatable stem to a binaural. The chestpiece body is made primarily of plastic with a steel bushing that receives one end of the rotatable stem. A spring positioned within the stem projects outwardly and is adapted to engage grooves or slots formed in the bushing for selective rotation of the stem relative to the chestpiece.

BRIEF DESCRIPTION OF THE DRAWINGS

The foregoing objects and advantages of the present invention will be more clearly understood when considered in conjunction with the accompanying drawings in which:

FIG. 1 is a top plan view of a stethoscope chestpiece embodying a preferred form of the invention;

FIG. 2 is a partially cross-sectional view taken substantially along the line 2—2 of FIG. 1; and FIG. 3 is a detail taken on the line 3—3 of FIG. 2.

DESCRIPTION OF THE PREFERRED EMBODIMENT

Referring to the preferred embodiment illustrated in the drawings, there is shown a stethoscope chestpiece having a body 1 formed of a molded plastic material. This body has a pair of sound-receiving chambers 2 and 3. Bell-shaped, sound-receiving chamber 2 has an aperture 4 extending axially through it in alignment with an aperture 5 formed in sound-receiving chamber 3. A diaphragm 6 formed of a thin, flexible, resilient member is stretched and secured over the sound-receiving chamber 3. This diaphragm 6 may be formed with integral rim 7 or, alternately, a separate ring 7 may be formed with a lower lip adapted to engage and secure the diaphragm 6 against the concave surface of the sound chamber 3. Preferably, the periphery 9 of the sound-receiving chamber 3 is formed with an offset shoulder 10 that extends about the periphery and is adapted to engage a corresponding shoulder on the inner surface of the rim 7. The shoulder 10 is flared outwardly from the concave surface of the sound-receiving chamber 3.

Extending axially through the body 1 is a cavity which is open at one end 20, and which terminates within the body 1 intermediate the sound-receiving chambers 2 and 3. This cavity 21 is in fluid communication with the apertures 4 and 5. The cavity 21 is preferably cylindrical in cross section, and is designed to receive a metal sleeve bushing 24. The bushing 24 should be oversized with a rough surface so as to frictionally engage the surface of the cavity 21. The sleeve bushing 24 is open at each end and is provided with opposed apertures 4A and 5A aligned respectively with the apertures 4 and 5 in the body 1. The bushing 24 is also provided with a pair of grooves 26, diametrically opposite to each other and extending from end 27 of the bushing. The grooves 26 preferably extend from the end 27 of the bushing parallel to its longitudinal axis to a point short of the aligned apertures 4A and 5A. These grooves preferably should have a depth in the order of at least 15 to 25 percent of the thickness of the bushing 24. Preferably, these grooves are formed with sidewalls that extend to the inner surface of the bushing 24 at an angle with respect to a plane through the axis of the bushing of 45°.

Secured within the bushing 24 is a rotating stem 30. This stem 30 is preferably formed of a metal such as stainless steel and has a longitudinally knurled end 31 that is tapered at its extreme tip 32 so as to be readily interengaged with a flexible binaural tube. This end 31 of the stem 30 extends angularly with respect to the other end 34. The end 34 of the stem projects into and is secured for rotation in the sleeve bushing 24. The end 34 of the stem is formed with diametrically opposed slots 37, which extend from one end longitudinally of the axis. The end 34 is formed with a retaining shoulder 38 that extends about the periphery of end 34 and projects outwardly thereof. This annular shoulder 38 is designed to interlock and engage the end 27 of the bushing 24 so as to secure the stem 30 within the bushing 24 with freedom of relative rotation of the stem with respect to the bushing.

The stem 30 is provided with a hole 40 that is adapted to be rotated from alignment with the apertures 5 and 5A to alignment with the apertures 4 and 4A for admission through these aligned apertures of the sound from the sound-receiving chambers into the interior 44 of the rotatable stem 30.

The stem 30 is adapted to be rotatably snapped from a position in which the hole 40 is aligned with the apertures 5 and 5A to a diametrically opposite position in which the hole 40 is aligned with the apertures 4 and 4A. The means by which this snap interengagement is provided is a spring 45 which is preferably U-shaped in configuration and has bulging projecting portions. The legs of this spring are positioned within the passage 44 with the bulging portions projecting through the slots 37 and into resilient engagement with the grooves 26 upon rotation of the stem 30 over a 180° arc of rotation. This spring 45 also has a bight 46 that bears against the bottom of cavity 21 and exerts axial pressure on the stem 30.

The plastic body may be made of a suitable plastic, such as polypropylene, or commercial plastic, such as Delrin.

What is claimed is:

1. A stethoscope chestpiece formed of an injection-molded, plastic body having at least one sound-receiving chamber,
   a cavity formed in said body with one end communicating with said chamber,
   a metal sleeve bushing secured in said aperture, and
   a metal, rotatable stem having one end extending into and secured within said sleeve.

2. A stethoscope chestpiece as set forth in claim 1 having a pair of sound-receiving chambers arranged in opposed alignment and both in fluid communication with said cavity.

3. A stethoscope as set forth in claim 2 wherein said metal sleeve bushing is formed with apertures aligned with apertures connecting said cavity with said sound chambers.

4. A stethoscope as set forth in claim 3 wherein said metal sleeve bushing has one end spaced from the bottom of said cavity and said stem is formed with an outwardly flared shoulder on said one end with said shoulder positioned between said bottom of said cavity and said one end of said bushing.

5. A stethoscope as set forth in claim 4 having locking means for securing said stem in one of two positions of rotation comprising opposed slots in said one end of said stem and grooves in the inner surface of said bushing adapted to be aligned with said slots and a spring having portions extending through said slots and adapted to be engaged by said grooves.

6. A stethoscope as set forth in claim 4 having a periphery about a sound chamber formed with a shoulder and a diaphragm covering said chamber having a rim extending angularly from the diaphragm with said rim engaging said shoulder.

References Cited

UNITED STATES PATENTS

| 2,893,507 | 7/1959 | Friedman | 181—24 |
| 3,108,652 | 10/1963 | Littmann | 181—24 |
| 3,316,998 | 5/1967 | Krug | 181—24 |

STEPHEN J. TOMSKY, Primary Examiner